(12) United States Patent
Goncalves et al.

(10) Patent No.: US 9,614,802 B2
(45) Date of Patent: Apr. 4, 2017

(54) SHARING CONTENT WITHIN AN EVOLVING CONTENT-SHARING ZONE

(71) Applicant: MOTOROLA MOBILITY LLC, Libertyville, IL (US)

(72) Inventors: Alex G. Goncalves, Sunnyvale, CA (US); Maria N. Mokhnatkina, San Jose, CA (US)

(73) Assignee: Google Technology Holdings Inc., Mountain View, CA (US)

( * ) Notice: Subject to any disclaimer, the term of this patent is extended or adjusted under 35 U.S.C. 154(b) by 195 days.

(21) Appl. No.: 14/174,866

(22) Filed: Feb. 7, 2014

(65) Prior Publication Data
US 2015/0039692 A1  Feb. 5, 2015

Related U.S. Application Data

(60) Provisional application No. 61/861,516, filed on Aug. 2, 2013.

(51) Int. Cl.

| | |
|---|---|
| *G06F 15/16* | (2006.01) |
| *H04L 12/58* | (2006.01) |
| *H04L 29/08* | (2006.01) |
| *H04L 12/18* | (2006.01) |
| *G06F 17/30* | (2006.01) |

(52) U.S. Cl.
CPC ........ *H04L 51/20* (2013.01); *G06F 17/30041* (2013.01); *G06F 17/3087* (2013.01); *H04L 12/1822* (2013.01); *H04L 12/1827* (2013.01); *H04L 67/22* (2013.01)

(58) Field of Classification Search
CPC .. H04L 12/1822; H04L 12/1827; H04L 67/22
USPC ............... 709/202–205, 217–219, 227–228, 709/245–246
See application file for complete search history.

(56) References Cited

U.S. PATENT DOCUMENTS

| | | |
|---|---|---|
| 8,284,748 B2 | 10/2012 | Borghei |
| 8,380,225 B2 | 2/2013 | Cheng et al. |
| 8,392,526 B2 | 3/2013 | Mallet et al. |

(Continued)

OTHER PUBLICATIONS

Written Opinion of the International Searching Authority and International Search Report for PCT/US2014/049135.

(Continued)

*Primary Examiner* — Bharat N Barot
(74) *Attorney, Agent, or Firm* — IP Spring (57) ABSTRACT

A user selects a content item that he wishes to send. He then performs a "sending" gesture and specifies an initial "content-sharing zone." In order to be eligible to receive the selected content item, a receiving device must be located within the content-sharing zone. However, the content-sharing zone can evolve over time. It can grow in size, change shape, or move (e.g., it can remain centered on the sending user as he moves). A potential recipient makes a "receiving" gesture, and, if the location of the receiving device is located within the evolving content-sharing zone, as currently defined, then the content item is sent from the sending device to the receiving device (either directly or via a content server). A maximum size or duration of the evolving content-sharing zone can be specified. Other restrictions can be stated so that, for example, only intended recipients can receive the content item.

22 Claims, 10 Drawing Sheets

(56) References Cited

U.S. PATENT DOCUMENTS

| | | | |
|---|---|---|---|
| 8,510,383 B2* | 8/2013 | Hurley | H04L 67/18 |
| | | | 709/205 |
| 8,621,352 B2* | 12/2013 | Ding | H04L 12/1827 |
| | | | 709/204 |
| 2011/0029538 A1 | 2/2011 | Harple, Jr. et al. | |
| 2011/0173249 A1* | 7/2011 | Lee | H04W 72/005 |
| | | | 709/203 |
| 2012/0270563 A1 | 10/2012 | Sayed | |
| 2013/0086087 A1 | 4/2013 | Jung et al. | |
| 2013/0304817 A1* | 11/2013 | Hu | H04N 21/41407 |
| | | | 709/204 |
| 2014/0025766 A1* | 1/2014 | Beck | H04L 67/22 |
| | | | 709/204 |
| 2015/0156610 A1* | 6/2015 | Eland | H04W 4/023 |
| | | | 709/204 |
| 2016/0197862 A1* | 7/2016 | Moyers | H04L 12/1822 |
| | | | 709/204 |

OTHER PUBLICATIONS

Patrick Stuedi, The Cloud is the Router: Enabling Bandwidth-Efficient and Privacy-Aware Mobile Applications with Contrail, http://research.microsoft.com/pubs/132903/contrail_tech_report.pdf, Jun. 2010, pp. 1 to 15.

\* cited by examiner

SHARING CONTENT WITHIN AN EVOLVING CONTENT-SHARING ZONE

CROSS-REFERENCE TO RELATED APPLICATION

The present application claims priority to U.S. Provisional Patent Application 61/861,516, filed on Aug. 2, 2013, which is incorporated herein by reference in its entirety.

TECHNICAL FIELD

The present disclosure is related generally to media-content delivery and, more particularly, to social communications.

BACKGROUND

People are sharing more and more information electronically. They send e-mails and short text messages to friends and colleagues. Photographs, videos, and sound clips are often posted to social-networking sites. In social situations, people often want to quickly share photographs or other content with their friends.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

While many content-sharing applications exist, they are often designed for personal computers that have large screens and a full keyboard. When a user wishes to, for example, send a photograph from his smartphone to a couple of friends in the same room, the limited user interface of the smartphone (small screen, very small or non-existent keyboard) makes these conventional content-sharing applications seem clumsy and intrusive. Also, most conventional content-sharing applications require the sender to navigate through the application's user interface once for each intended recipient.

Figure 1A:
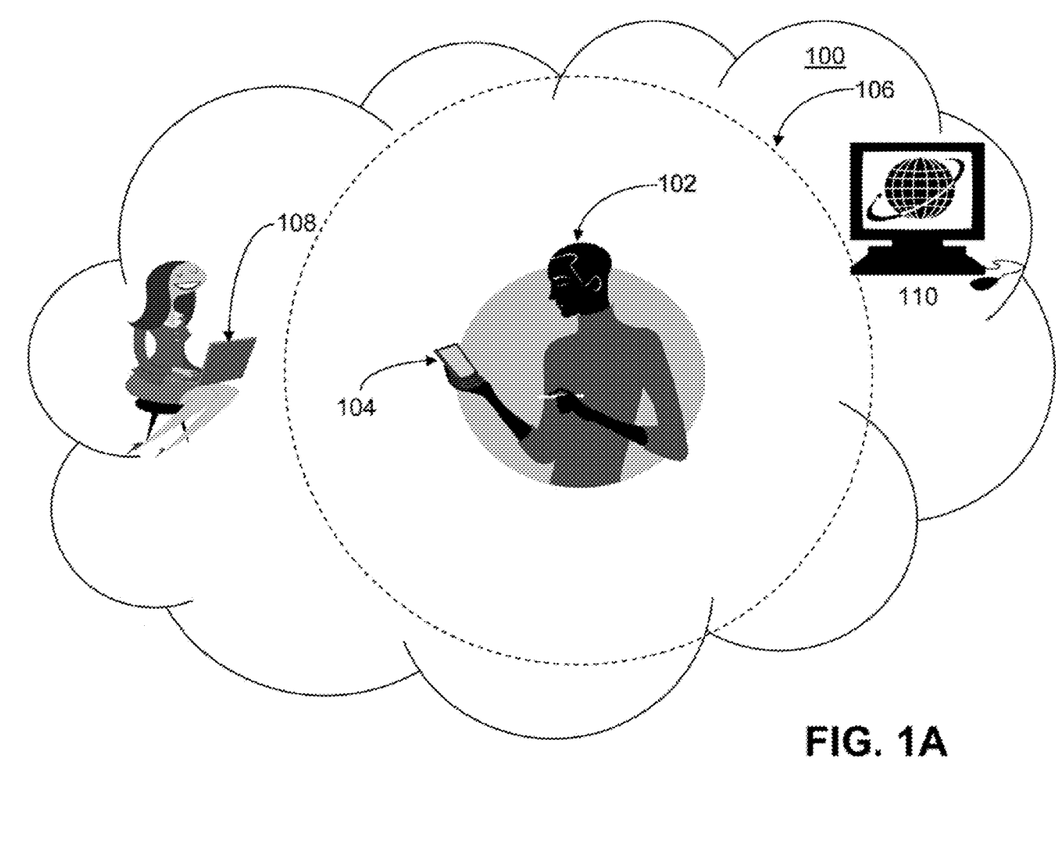
FIGS. 1A, 1B, and 1C together present an overview of a representative environment in which the present techniques may be practiced.
Figure 1B:
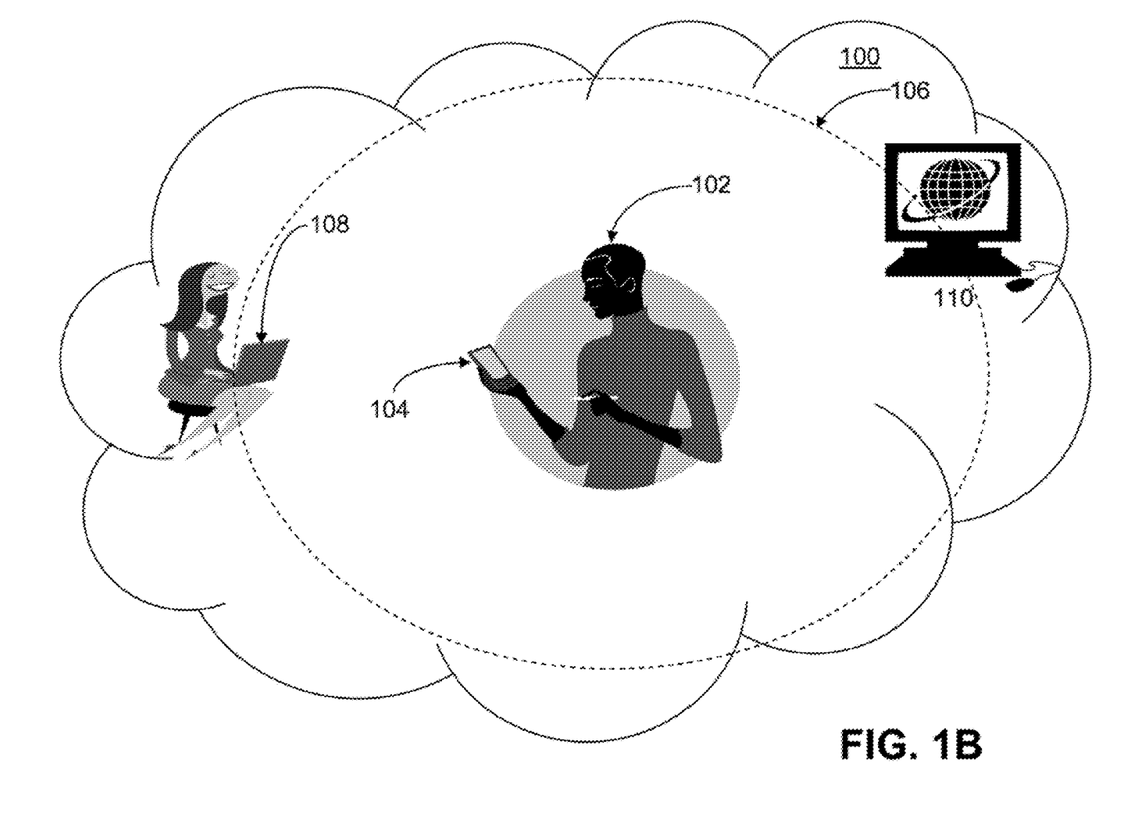

Consider the communications environment 100 of FIG. 1A. The user 102 wishes to send some content (e.g., a photograph) from his portable communications device 104 to his friend's device 108. According to aspects of the present disclosure, after selecting the content item that he wishes to send, the user 102 performs a gesture specifying that he wishes to send the content item. For example, he pretends to "throw" his device 104 (e.g., like throwing a ball or like throwing a flying disc). The sending user 102 also specifies a "content-sharing zone" 106. In order to be eligible to receive the selected content item, a receiving device 108 must be located within the content-sharing zone 106. In the example of FIG. 1B, the friend's device 108 lies outside of the content-sharing zone 106, so she cannot receive the content item.

However, according to aspects of the present disclosure, the content-sharing zone 106 can evolve over time. FIG. 1B presents an exemplary scenario somewhat later in time than the original scenario of FIG. 1A. By comparing FIGS. 1A and 1B, it can be seen that the content-sharing zone 106 has expanded laterally (thus increasing in area while changing in shape from a circle to an oval.) Now, the friend's device 108 is within the expanded content-sharing zone 106. To receive the content item, the friend makes a "receiving" gesture. For example, she moves her device 108 to pretend to "catch" a ball thrown. If the receiving gesture is made at a time when the location of the device 108 is within the content-sharing zone 106 as currently defined, then the content item is sent from the sender's device 104 to the recipient's device 108 (either directly or via the content server 110, as explained below with reference to FIGS. 5A and 5B).

Figure 1C:
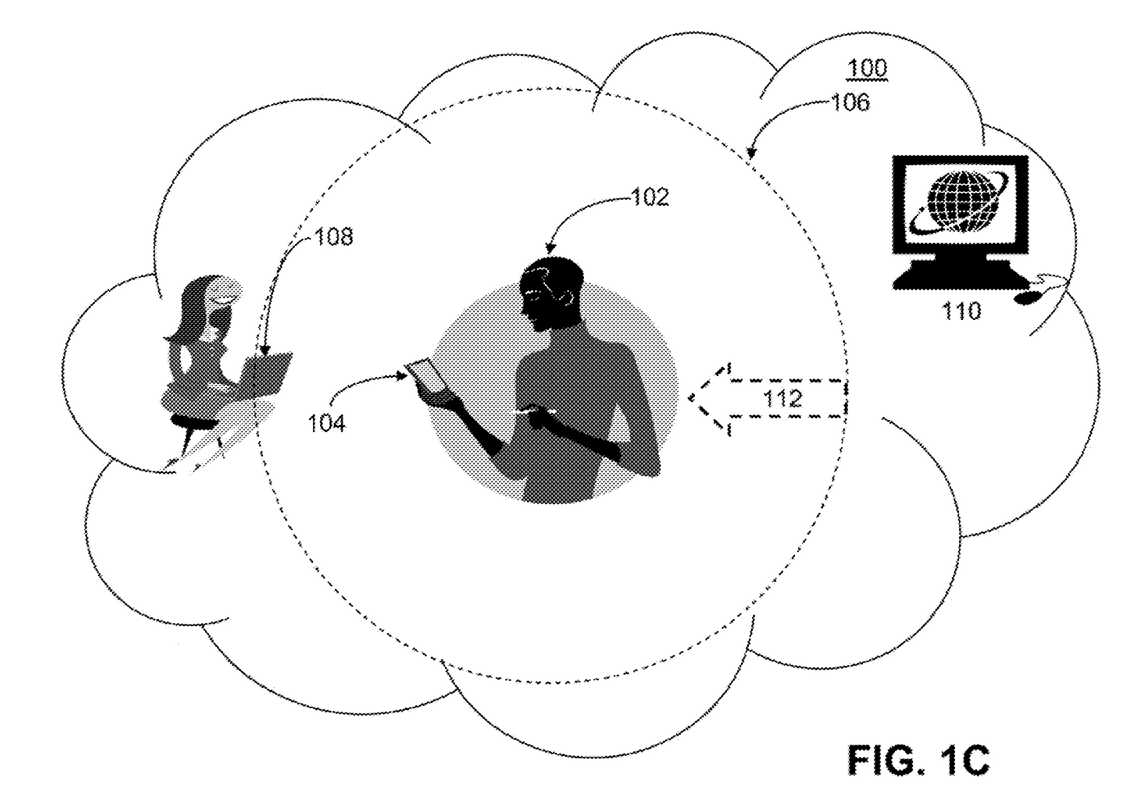

FIG. 1C gives another example of how the content-sharing zone 106 can evolve over time. The original scenario is, again, that of FIG. 1A. By the time of FIG. 1C, the content-sharing zone 106 has not changed in size or shape, but it has moved to the left (as indicated by arrow 112), remaining centered on the sending user 102. Again, the friend's device 108 is now within the moved content-sharing zone 106, so the friend can receive the content.

Consider just one more example of an evolving content-sharing zone 106. In this case, the sending user 102 is traveling quickly, say on a train, and he wishes to send the content item to his friend's device 108. His friend is sitting next to him. However, because the train is moving, if the location of the content-sharing zone 106 were defined in terms of static geometry (that is, in terms of fixed geographical coordinates), then the sending user 102 and his friend may have both left the zone 106 far behind before she makes her receiving gesture. To prevent this failure to communicate, the zone 106 can either (1) have its location based on the moving position of the sending user 102 (as in FIG. 1C) so that it stays around him (and, consequently, includes the position of his fellow traveler) or (2) expand in size, its expansion rate based, for example, on the rate at which the sending user 102 is traveling, and thus continue to include the moving position of his friend.

Enhancements to the basic scheme described above can be made to, for example, specify a maximum size or duration of the evolving content-sharing zone 106. Several ways of defining the original content-sharing zone 106 and its evolution are contemplated and discussed below. Other restrictions can be stated so that, for example, only intended recipients can receive the content item even if other potential recipients are located within the evolving content-sharing zone 106 and make appropriate receiving gestures.

Figure 2:
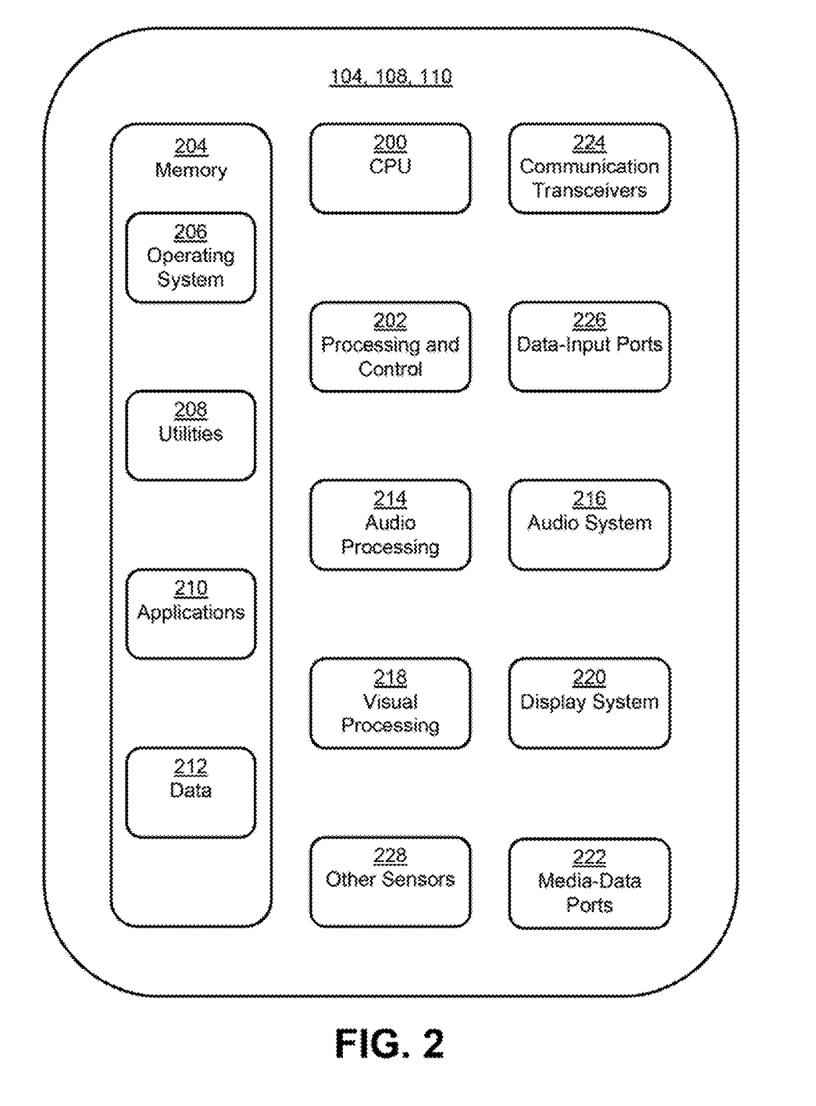
FIG. 2 is a generalized schematic of some of the devices of FIGS. 1A, 1B, and 1C.

FIG. 2 shows the major components of a representative electronics device 104, 108, 110. A portable communications device 104, 108 could be, for example, a smartphone, tablet, personal computer, electronic book, or gaming controller. The content server 110 could be any of these and could also be a set-top box, a compute server, or a coordinated group of compute servers.

Figure 3A:
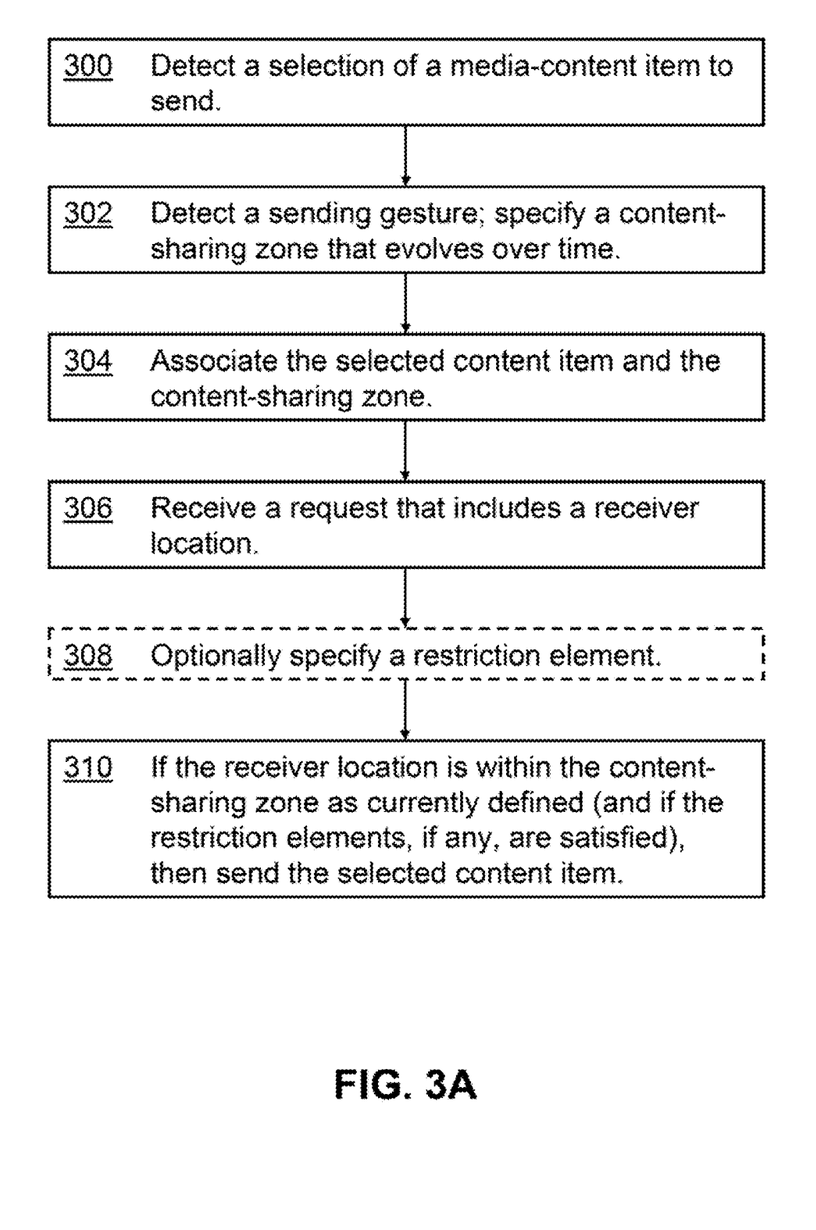
FIGS. 3A and 3B are flowcharts of representative methods for using a gesture to send content.
Figure 3B:
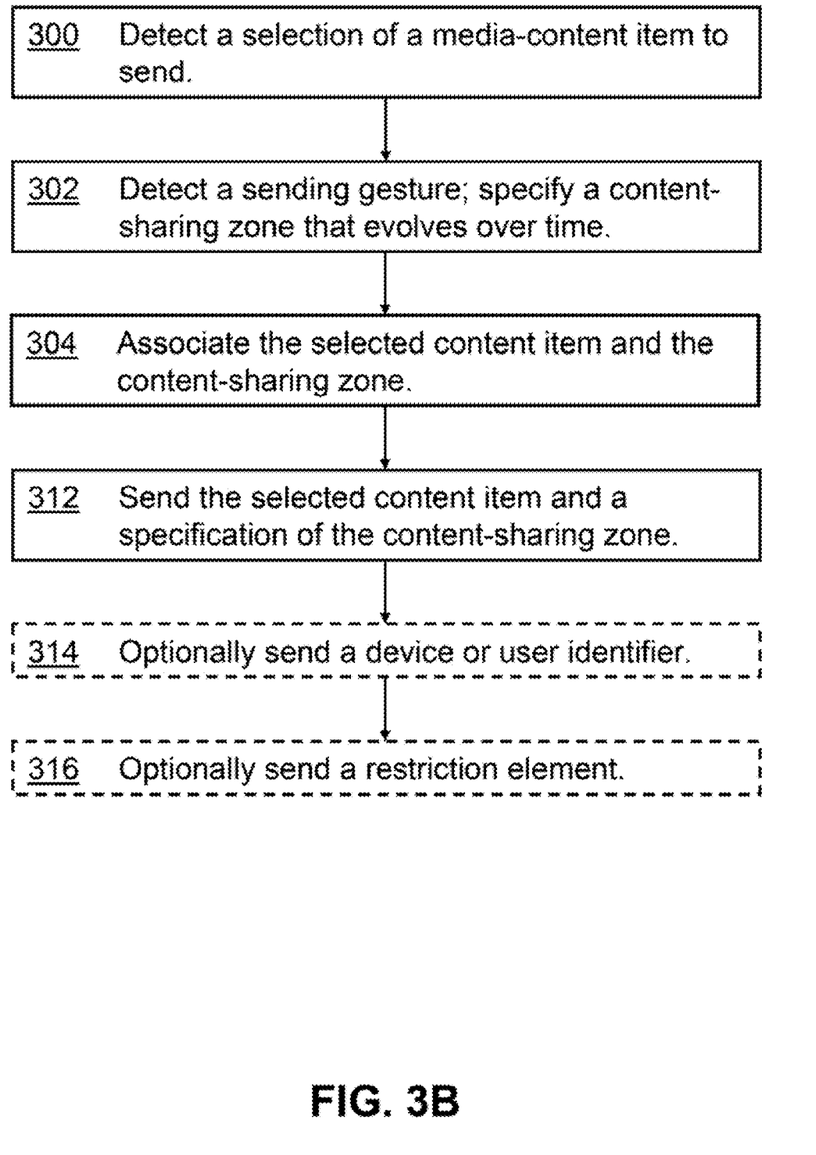
Figure 4A:
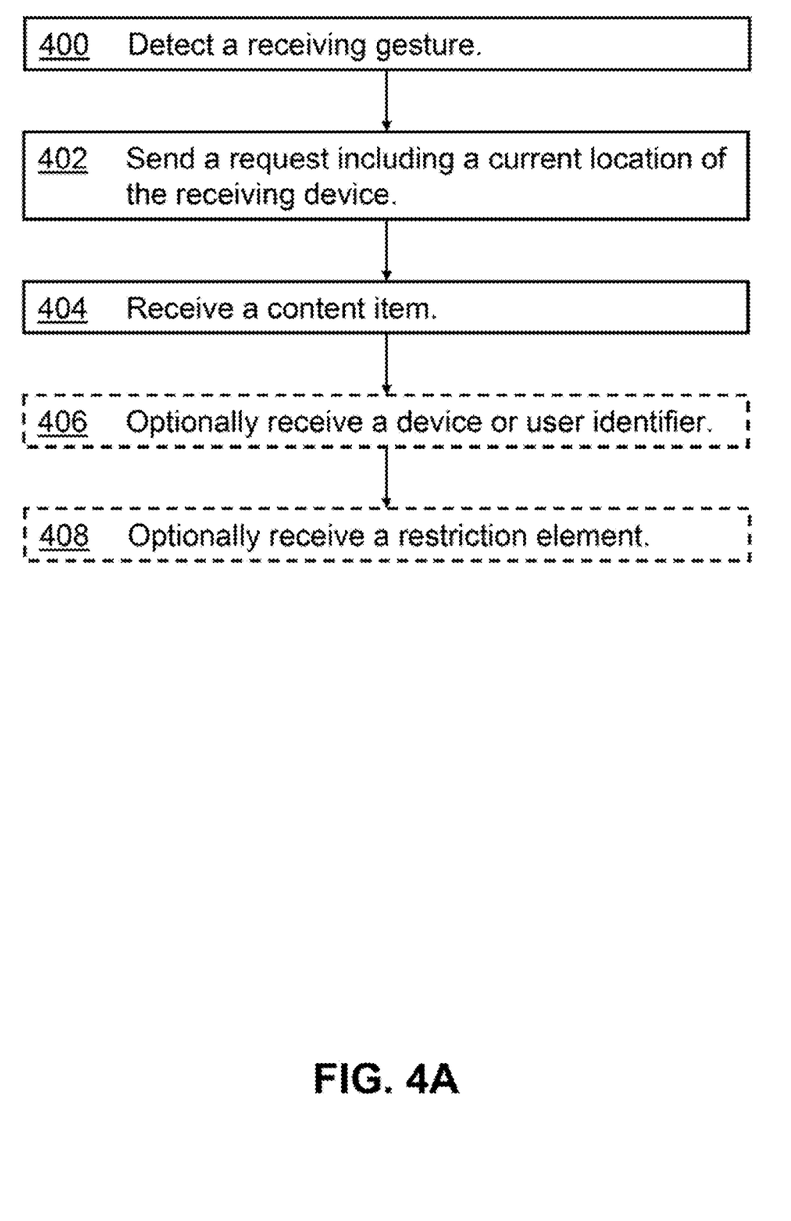
FIGS. 4A and 4B are flowcharts of representative methods for using a gesture to receive content.
Figure 4B:
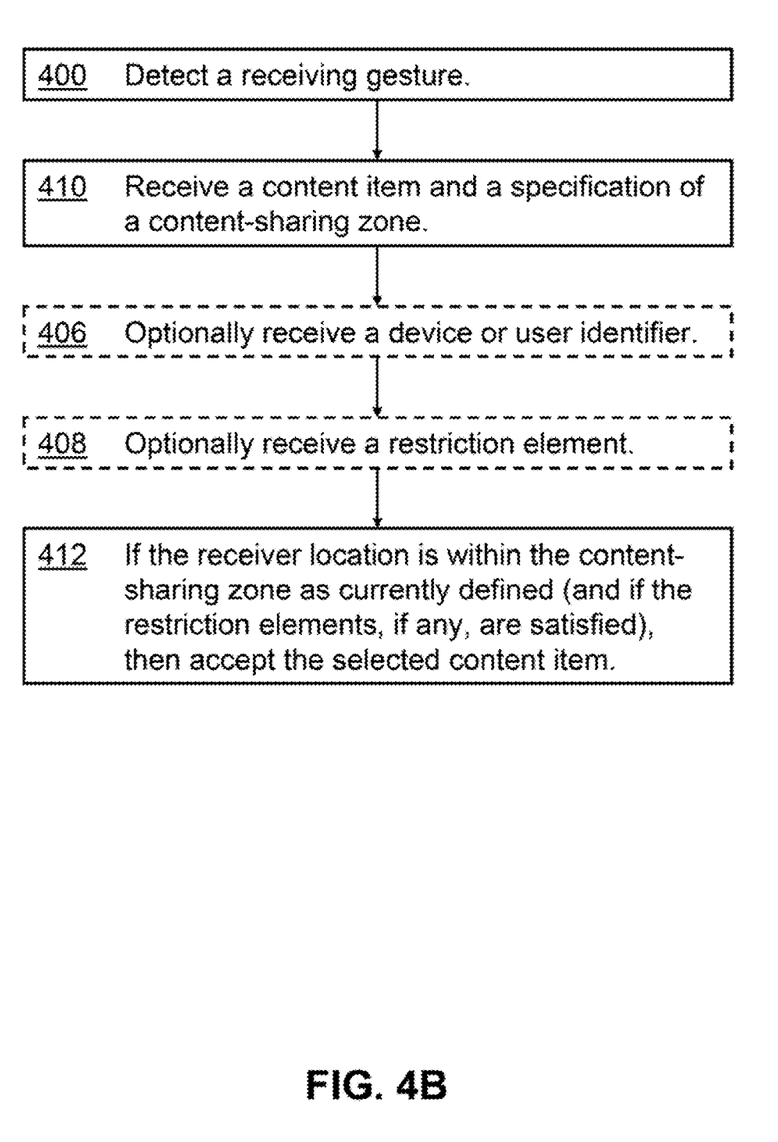
Figure 5A:
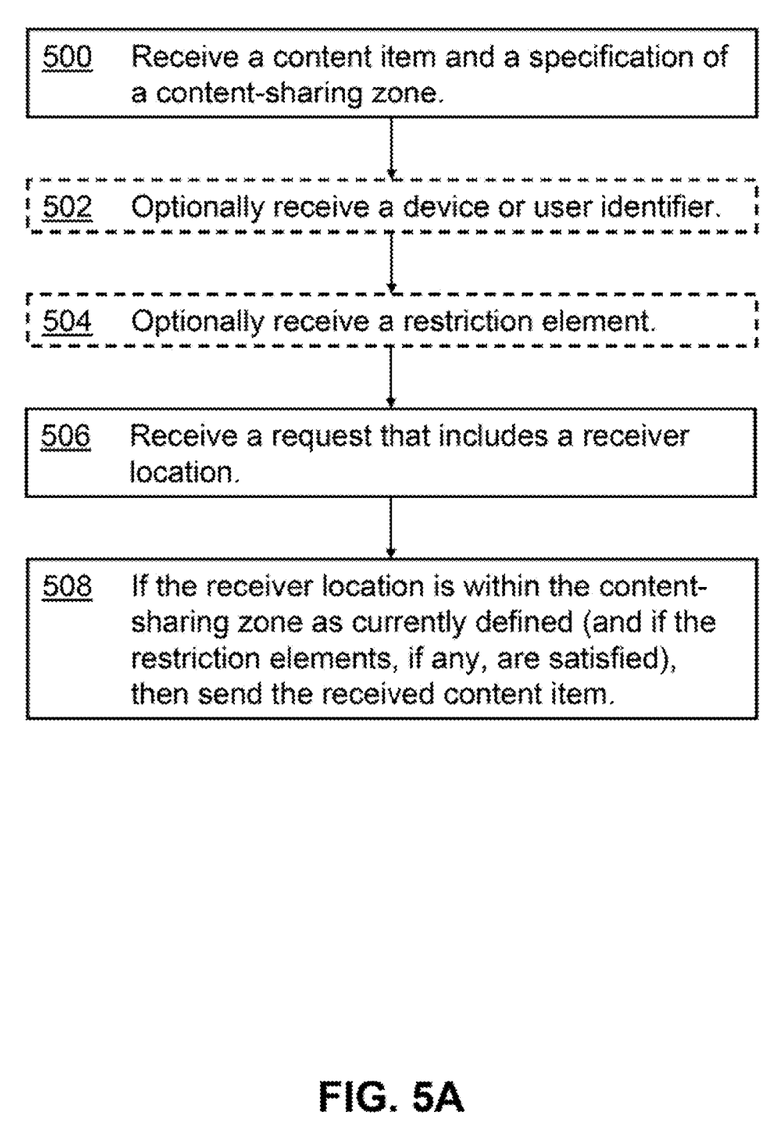
FIGS. 5A and 5B are flowcharts of representative methods usable by a server to transmit content.
Figure 5B:
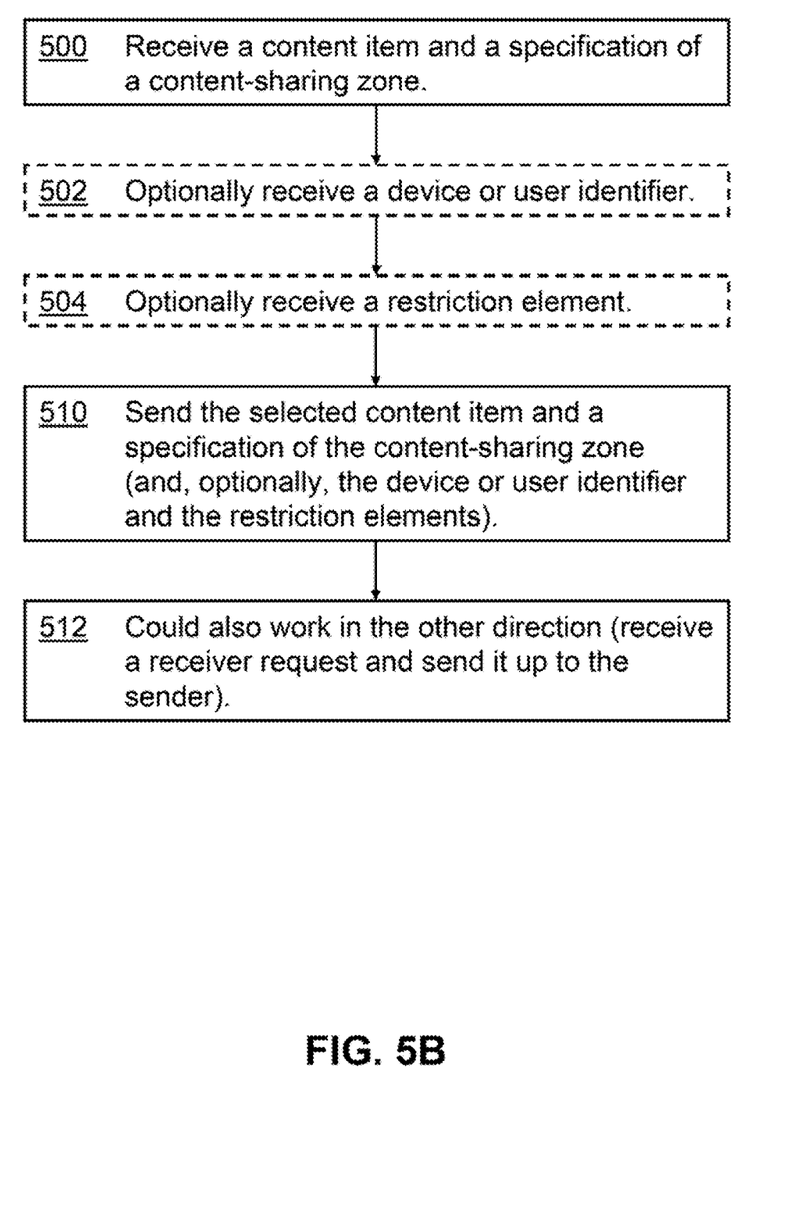

The central processing unit ("CPU") 200 of the electronics device 104, 108, 110 includes one or more processors (i.e., any of microprocessors, controllers, and the like) or a processor and memory system which processes computer-executable instructions to control the operation of the device 104, 108, 110. In particular, the CPU 200 supports aspects of the present disclosure as illustrated in FIGS. 3 through 5, discussed below. The device 104, 108, 110 can be implemented with a combination of software, hardware, firmware, and fixed-logic circuitry implemented in connection with processing and control circuits, generally identified at 202. Although not shown, the device 104, 108, 110 can include a system bus or data-transfer system that couples the various components within the device 104, 108, 110. A system bus can include any combination of different bus structures, such as a memory bus or memory controller, a peripheral bus, a universal serial bus, and a processor or local bus that utilizes any of a variety of bus architectures.

The electronics device 104, 108, 110 also includes one or more memory devices 204 that enable data storage, examples of which include random-access memory, non-volatile memory (e.g., read-only memory, flash memory, erasable programmable read-only memory, and electrically erasable programmable read-only memory), and a disk storage device. A disk storage device may be implemented as any type of magnetic or optical storage device, such as a hard disk drive, a recordable or rewriteable disc, any type of a digital versatile disc, and the like. The device 104, 108, 110 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronics device 104, 108, 110, a hardware-abstraction layer for a particular component, and so on.

The electronics device 104, 108, 110 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 104, 108, 110. Alternatively (e.g., in a cellular telephone), these systems 216, 220 are integrated components of the device 104, 108, 110.

The electronics device 104, 108, 110 can include a communications interface which includes communication transceivers 224 that enable wired or wireless communication. Example transceivers 224 include Wireless Personal Area Network radios compliant with various Institute of Electrical and Electronics Engineers ("IEEE") 802.15 standards, Wireless Local Area Network radios compliant with any of the various IEEE 802.11 standards, Wireless Wide Area Network cellular radios compliant with 3rd Generation Partnership Project standards, Wireless Metropolitan Area Network radios compliant with various IEEE 802.16 standards, and wired Local Area Network Ethernet transceivers.

The electronics device 104, 108, 110 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include Universal Serial Bus ports, coaxial-cable ports, and other serial or parallel connectors (including internal connectors) for flash memory, storage disks, and the like. These data-input ports 226 may be used to couple the device 104, 108, 110 to components, peripherals, or accessories such as microphones and cameras.

Finally, the electronics device 104, 108, 110 may include any number of "other sensors" 228. These sensors 228 can include, for example, accelerometers, a GPS receiver, compass, magnetic-field sensor, and the like.

FIG. 3A presents a first method for sending a content item. In step 300, the user 102 uses any known technique for selecting a content item to send. He may, for example, touch an icon corresponding to the content item to select it. If he takes a picture with his portable communications device 104, and that picture is displayed on a screen of the device 104, then that picture may be selected by default until unselected. The user 102 may even select multiple content items, such as a directory and all its contents. In some cases, he can run a specific application on his device 104 that presents possible content items to him for his selection.

The user 102 then makes a "sending" gesture using his portable communications device 104 (step 302). For example, he may pretend to throw his device 104. Position sensors (e.g., accelerometers, a compass, or a magnetic-field sensor 228) on the device 104 note the movement and send their data to the CPU 200 which interprets the gesture and recognizes it as a sending gesture. In another example, he can select a content item by touching its icon on the display screen of his device 104 and move his finger as if to "flick" the icon. Other gestures are possible including more traditional keyboard-based commands.

Also in step 302, the sending user 102 specifies the content-sharing zone 106 that is to be associated with the content item selected in step 300. FIG. 3A puts this in step 302 along with the sending gesture because, in some embodiments, the sending gesture specifies the content-sharing zone 106. For example, a more vigorous "throwing" gesture may indicate a larger initial content-sharing zone 106. In other situations, the initial size, shape, and location of the zone 106 can be specified in, e.g., a preference set by the sending user 102 or by default in a content-sharing application.

The content-sharing zone 106 may initially be a circle surrounding the sending user 102 at the time that the sending gesture is detected, as in the example of FIG. 1A. In another example, the zone 106 may be a geo-fenced area (e.g., the room in which the sending user 102 is initially located). The initial size of the zone 106 can be set based on the current location or activity of the sending user 102. A smaller zone 106 may be appropriate within a house than within a football stadium, for example. The shape of the zone 106 need not be symmetrical around the sending user 102. For example, the sending gesture of the user 102 may specify a particular direction (e.g., the direction in which he pretends to throw his device 104), and the zone 106 may extend in that general direction but not behind the user 102. As for location, there is no requirement that the zone 106 contain the location of the sending user 102. (That is, the sending user 102 can "lob" the selected content item, specifying a circular zone 106 some distance from his current location.) As mentioned above, other possibilities for the initial size, shape, and location of the zone 106 are easily contemplated and can be set through a gesture-recognition utility or through other user interfaces.

In addition to specifying the original geometry of the content-sharing zone 106, the sending user 102 (directly or indirectly) specifies how that zone 106 evolves over time. For example, by default the zone 106 may be a circle of radius 5 meters centered on the sending user 102. By default, the zone 106 may increase in size until it achieves a maximum radius of 15 meters over the course of 15 minutes, and then the zone 106 disappears. As mentioned above in the example of FIG. 1B, the zone 106 may change in both size and shape over time. A geo-fenced zone 106 may evolve to track the location (or other behavior) of the sending user 102. In some cases (see FIG. 1C), the size of the zone 106 does not evolve over time, but its location does.

The initial geometry and evolution of the content-sharing zone 106 may be tied together. For example, the initial geometry and its evolution may both be tied to a movement of the sending user 102 detected at the time that the sending gesture is recognized.

Boundaries can be set on the evolution of the content-sharing zone 106. In an example above, the zone 106 is set to disappear entirely 15 minutes after the initial sending gesture was detected. The zone 106 can be set to live forever (until explicitly cancelled by, for example, the sending user 102) but to grow only until it reaches a certain size. That is to say, the zone 106 need not evolve over all time, it can evolve and then become static or vice versa.

In addition to selecting a content item and specifying the content-sharing zone 106, the sending user 102 may specify other characteristics of the sending. For clarity's sake, the discussion of these other characteristics is postponed until step 308, below.

The content item and the content-sharing zone 106 are logically associated in step 304. This step is meant simply as shorthand for a memory operation. As discussed below, the content item need not be sent immediately, so it may be important to remember the association of the content item with its zone 106 for later use.

In step 306, the user's portable communications device 104 receives a request that includes a location of a potential receiving device 108. As discussed in more detail below with respect to FIGS. 4A and 4B, a potential recipient made a receiving gesture. In the particular embodiment of FIG. 3A, information is sent in a request and is received by the sender's device 104 in step 306. (Generally speaking, the sending device 104 may use other technologies to learn the current location of the potential receiver 108, so receiving the location report from the potential receiver 108 is not strictly necessary.)

While optional step 308 logically precedes step 310, for clarity's sake the discussion of step 308 follows that of step 310.

In step 310, the content-sharing zone 106 specified by the sending user 102 (step 302) and the receiver location contained in the request received in step 306 are compared. If the receiving location is within the zone 106, as currently defined, then (if all other restriction elements from optional step 308 are satisfied) the selected content item is sent from the sender's portable communications device 104 to another device, generally the device that sent the request received in step 306. Note that the phrase "as currently defined" means that the receiver's location is compared against the geometry of the content-sharing zone 106 as it exists at the time that step 310 occurs. If step 310 were performed when the zone 106 is as shown in the example of FIG. 1A, then the sharing request would be denied because the location of the potential receiver 108 is not with the zone 106. If, however, the same request is received, and step 310 is performed, when the zone 106 has evolved to match that of one of the scenarios of FIGS. 1B and 1C, then the request would be honored.

The examples just given, though useful, are perhaps too simple. More realistically, the sending process is associated with one or more optional "restriction elements" (step 308). One potential restriction element is a time limit. According to aspects of the present disclosure, there is no requirement that the sending 104 and receiving 108 devices actually be physically near one another at the time of transmission. There is no need for the two devices 104, 108 to use a "handshake" to set up the potential transfer. (In these cases, an intermediary content server 110 can be used. Please see the discussion accompanying FIGS. 5A and 5B below.) Thus, the sending user 102 can specify that the selected content item is available for reception for only, say, the next five minutes.

(Note that in general, the methods of the present disclosure do not require detecting the location or even the presence of another device in order to communicate with that device: A comparison of the content-sharing zone, as currently defined, and the location of the potential receiver is sufficient.)

As another example of a restriction element, known techniques of encryption, security, and privacy can be applied to the potential transfer. Thus, a potential recipient device 108 may need to identify itself to the sending device 104 before the content is transferred. The sender 102 himself may specify, e.g., in a profile setting, that content transferred using the present techniques can only go to those people identified in a contacts list on his device 104.

As mentioned above, the transfer of the content item in step 310 only proceeds if the restriction elements in place (if any) are satisfied.

In some embodiments, when the content item is sent is step 310, along with it is sent an identifier of the sending user 102 or of his sending device 104. This information can be used by the receiving device 108 as discussed below.

FIG. 3B presents another method for sending a content item. The first steps 300 through 304 are the same as in the method of FIG. 3A. Then, however, instead of receiving a reception request (as in step 306 of FIG. 3A), this method transmits the selected content item along with information about the content-sharing zone 106 in step 312. The implication is that the comparison of the receiver's location with the zone 106 (done in step 310 in the method of FIG. 3A) will be done by a device other than the sending device 104. (Some possibilities for those other devices are discussed below in reference to FIGS. 4 and 5.) To make sure that that device has all the necessary information, the sending user 102 can also send an identification of himself 102 or of his device 104 (optional step 314) and any restriction elements (optional step 316).

A potential receiving device 108 can perform the method of FIG. 4A. In step 400, the device 108 detects a receiving gesture. Gesture-detection can be performed using the techniques discussed above in relation to step 302 of FIG. 3A. However, there is no requirement that the receiving gesture be complementary to the sending gesture. Thus, the sending user 102 may pretend to "throw" the selected content item, while the receiver 108 can make a reverse "flick" on a touch-screen to receive it.

Note that there is no requirement that a potential recipient 108 make the receiving gesture of step 400 in response to seeing (or otherwise knowing about) the sender's sending gesture. There need be no "handshaking" either of devices or of people for the present techniques to work. Indeed, the sending user 102 may make his sending gesture and then leave the premises long before the potential recipient 108 makes her receiving gesture.

In step 402, the potential receiving device 108 sends a request that includes the current location of the receiving device 108. This may (but need not) be the same request received in step 306 of FIG. 3A. In any case, a content item is received in step 404. Note that in the particular method of FIG. 4A, the receiving device 108 does not need to compare its location with the content-sharing zone 106. It is assumed that this comparison is done on another device, and that a content item is only sent when the locations are compatible.

In optional steps 406 and 408, the potential recipient device 108 receives other information such as a sending user 102 or device 104 identifier and a restriction element. The potential recipient 108 can use this information in deciding whether or not to accept the content item received in step 404. For example, the potential recipient 108 may be configured to only accept content items from known senders 102. As another use of a restriction element, the content item may be received in an encrypted form, and only authorized recipients 108 are given access to the decryption key.

FIG. 4B presents another method for receiving a content item. A receiving gesture is detected in step 400, as discussed above in reference to FIG. 4A. Then, in step 410, a content item is received along with a specification of its associated content-sharing zone 106. This step may correspond to the sending step 312 of FIG. 3B. The receiving device 108 may also receive identification information and restriction elements in optional steps 406 and 408, also as discussed above. Finally, in step 412 the receiving device 108 compares its current location with the current geometry of the content-sharing zone 106 as received in step 410. If they are compatible (see the discussion of step 310 of FIG. 3A, above), then the content item is accepted (assuming that the restriction requirements, if any, are also satisfied).

In some cases, the content item is not transmitted directly from the sending device 104 to the receiving device 108. Instead, a content server 110 mediates the transmission. A first method usable by the content server 110 is illustrated in FIG. 5A. The method begins in step 500 when the content server 110 receives a content item and a specification of its associated content-sharing zone 106. This step may correspond to the sender's sending step 312 of FIG. 3B.

In steps 502 and 504, the content server 110 receives the further information and restriction requirements, if any, sent by the sending device 104.

A request from a potential recipient 108 is received in step 506, the request including a current location of the receiving device 108. This request may correspond to the request sent in step 402 of FIG. 4A. As in steps 310 of FIG. 3A and 412 of FIG. 4B, the receiver's location and the content-sharing zone 106 are compared, and, if compatible (and if the restriction elements, if any, are satisfied), then the content item and associated information are sent to the recipient 108 in step 508. This sending may correspond to the receiving of step 404 of FIG. 4A.

Note that the request of step 506 may be received long after (or, theoretically, even before), the content item is received in step 500. That is, the presence of the content server 110 removes any necessity of concurrency between the methods of the sending 104 and receiving 108 devices.

FIG. 5B presents a variant method practicable by the content server 110. Here, the content server 110 receives the content item, a specification of its associated content-sharing zone 106, and any further information and restriction elements in steps 500 through 504, as discussed above. The content server 110 then sends all of this along in step 510. Presumably, the recipient of this information would compare the receiver's current location with the current geometry of the content-sharing zone 106 for compatibility. (Please see the receiving method of FIG. 4B.) The content server 110 can also work in the reverse direction (step 512), receiving a reception request and passing it along to the sending device 104.

While FIGS. 3 through 5 present distinct methods, note that elements of these methods can be combined as necessary for different situations. So, for example, a sending device 104 would probably implement the methods of both FIGS. 3A and 3B, applying them as needed. As another example, a sending user 102 may use one method when he wishes to restrict the distribution of his content and use another method to broadcast the content broadly, giving full control to the potential recipients to decide whether they wish to accept the content or not.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for a content server to provide access to a content item, the method comprising:

receiving, by the content server from a sending portable communications device distinct from the content server, the content item and a specification of a content-sharing zone, wherein an initial size of the content-sharing zone is set based on at least one of a current location of the sending portable communications device and activity of a sending user of the sending portable communications device, and wherein the content-sharing zone evolves by changing in location such that the content-sharing zone follows the sending portable communications device as the sending portable communications device moves;

receiving, by the content server from a receiving portable communications device distinct from the content server, a request comprising a location of the receiving portable communications device; and if the received location of the receiving portable communications device is within the content-sharing zone as defined at a time of the content server receiving the request, then sending, by the content server to the receiving portable communications device, the content item.

2. The method of claim 1 wherein the content item comprises an element selected from the group consisting of: a social-networking post, a message, a file, a link to a file, an address, and a directory.

3. The method of claim 1 wherein the content-sharing zone is initially defined as a circle centered on a location of the sending portable communications device at a time when a sending gesture is detected.

4. The method of claim 3 wherein an initial radius of the circle is defined by a user of the sending portable communications device.

5. The method of claim 3 wherein the content-sharing zone evolves by remaining centered on a location of the sending portable communications device as the sending portable communications device moves.

6. The method of claim 3 wherein the content-sharing zone evolves by increasing a radius of the circle, the increasing based, at least in part, on a motion of the sending portable communications device.

7. The method of claim 6 wherein the increasing is bound, at least in part, by an element selected from the group consisting of:
    a maximum radius value set by a user of the sending portable communications device; and
    an amount of time elapsed since the sending gesture was detected.

8. The method of claim 1 wherein the content-sharing zone is initially defined as a geo-fenced area within which is a location of the sending portable communications device at a time when a sending gesture is detected.

9. The method of claim 8 wherein the geo-fenced area evolves by an element selected from the group consisting of: changing in shape, changing in size, and changing in location.

10. The method of claim 1 wherein the content-sharing zone evolves by being defined as a geo-fenced area within which is a location of the sending portable communications device at a time when the request is received.

11. The method of claim 1 further comprising:
    receiving, from the sending portable communications device, an element selected from the group consisting of:
        an identifier of the sending portable communications device; and
        an identifier of a user of the sending portable communications device; and
    sending, to the receiving portable communications device, the received element.

12. The method of claim 1 further comprising:
    receiving, from the sending portable communications device, a restriction element selected from the group consisting of:
        a time limit; and
        a recipient-identification requirement; and
    wherein sending is only performed if the received restriction element is satisfied.

13. A content server configured for providing access to a content item, the content server comprising:
    a communications interface configured for receiving, from a sending portable communications device distinct from the content server, the content item and a specification of a content-sharing zone, wherein an initial size of the content-sharing zone is set based on a current location of the sending portable communications device such that the initial size is a first size when the current location is a private location and a second size, larger than the first size, when the current location is a public location, and wherein the content-sharing zone evolves by changing in location such that the content-sharing zone follows the sending portable communications device as the sending portable communications device moves from a first location at a first time to a second location at a second time later than the first time, and for receiving, from a receiving portable communications device distinct from the content server, a request comprising a location of the receiving portable communications device; and
    a processor operatively connected to the communications interface and configured for:
        if the received location of the receiving portable communications device is within the content-sharing zone as defined at a time of the content server receiving the request, then sending, via the communications interface to the receiving portable communications device, the content item.

14. The content server of claim 13 wherein the content server is selected from the group consisting of: a personal communications device, a mobile telephone, a personal digital assistant, a tablet computer, a gaming controller, a set-top box, a compute server, and a coordinated group of compute servers.

15. The content server of claim 13 wherein the content item comprises an element selected from the group consisting of: a social-networking post, a message, a file, a link to a file, an address, and a directory.

16. The content server of claim 13 wherein the content-sharing zone is initially defined as a circle centered on a location of the sending portable communications device at a time when a sending gesture is detected.

17. The content server of claim 16 wherein an initial radius of the circle is defined by a user of the sending portable communications device.

18. The content server of claim 16 wherein the content-sharing zone evolves by remaining centered on a location of the sending portable communications device as the sending portable communications device moves.

19. The content server of claim 16 wherein the content-sharing zone evolves by increasing a radius of the circle, the increasing based, at least in part, on a motion of the sending portable communications device.

20. The content server of claim 13 wherein the content-sharing zone is initially defined as a geo-fenced area within which is a location of the sending portable communications device at a time when a sending gesture is detected.

21. The content server of claim 20 wherein the geo-fenced area evolves by an element selected from the group consisting of: changing in shape, changing in size, and changing in location.

22. The content server of claim 13 wherein the content-sharing zone evolves by being defined as a geo-fenced area within which is a location of the sending portable communications device at a time when the request is received.

* * * * *